United States Patent [19]

Ellis

[11] Patent Number: 5,329,101
[45] Date of Patent: Jul. 12, 1994

[54] INDUCTION HEATING APPARATUS WITH HINGED SUPPORT AND FILTERED AIR COOLING

[75] Inventor: Glynn A. Ellis, Long Eaton, Great Britain

[73] Assignee: Razedge Limited, Nottingham, Great Britain

[21] Appl. No.: 948,007

[22] Filed: Sep. 21, 1992

[30] Foreign Application Priority Data

Sep. 19, 1991 [GB] United Kingdom ............... 9120053

[51] Int. Cl.⁵ .............................................. H05B 6/04
[52] U.S. Cl. .................................... 219/632; 219/669; 219/670
[58] Field of Search ............. 219/10.75, 10.67, 10.77, 219/10.491, 10.493, 10.57, 10.79

[56] References Cited

U.S. PATENT DOCUMENTS

| | | | |
|---|---|---|---|
| 3,403,240 | 9/1968 | Henderson et al. | 219/10.491 |
| 3,967,089 | 6/1976 | Seulen et al. | 219/10.67 |
| 3,996,402 | 12/1976 | Sindt | 219/10.79 |
| 4,191,875 | 3/1980 | Cunningham | 219/10.493 |
| 4,357,512 | 11/1982 | Nishimoto et al. | 219/10.79 |
| 5,025,123 | 6/1991 | Pfaffmann et al. | 219/10.75 |
| 5,124,517 | 6/1992 | Storm et al. | 219/10.79 |

*Primary Examiner*—Philip H. Leung
*Attorney, Agent, or Firm*—Locke Reynolds

[57] ABSTRACT

A radio frequency heating apparatus incorporating a radio frequency generater valve (5), a radio frequency impedance matching transformer (7) and a heating coil-/element arrangement (14) which is arranged to be selectively displaceable with respect to a working zone, wherein the heating coil or heating element (14) is integrally associated with the radio frequency impedance matching transformer (7) and is so physically separated from the radio frequency generator valve (5) that on displacement of the heating coil/element arrangement the transformer is constrained to move therewith without mechanically displacing the generator valve (5).

13 Claims, 1 Drawing Sheet

INDUCTION HEATING APPARATUS WITH HINGED SUPPORT AND FILTERED AIR COOLING

BACKGROUND OF THE INVENTION

The present invention is concerned with induction heating apparatus, and more particularly with apparatus used for commercial and industrial heating purposes.

Induction heating is utilized for a wide range of activities such as, for example, the heating of materials such as metals, for the purposes of brazing, soldering, material hardening, material melting, plastics material curing, molding and gluing materials together and so on.

In the case of known apparatus the induction heating equipment involves a radio frequency electrical generator for the generation of the high frequency electric power field which produces the requisite heating effect in the articles/material to be induction heated.

Commonly, the radio frequency generator apparatus includes, for example, a radio frequency generator, a radio frequency impedance matching transformer, radio frequency concentrator unit and various associated capacitors. The concentrator unit is in turn is operationally coupled to the actual heating coil or heating element.

In practice, it is essential to ensure that this unit is radio frequency radiation safe.

The radio frequency power generator unit when in operation generates considerable quantities of heat so that it is essential to provide arrangements for cooling the various components involved in the high frequency generation arrangements. Generally, the cooling system involves a combination of air cooling and liquid cooling in relation to the actual induction heating coil/element, valve etc. The liquid cooling involves pumping coolant liquid though a fluid circuit including cooling sections, radiator arrangements for enabling the cooling of the coolant itself, and coolant pumping means.

The air cooling arrangements are used to produce a flow of cooling air through the radiator and any components that are more easily cooled by air flows.

Bearing in mind that induction heating equipment is likely to be utilized in a dirty environment it is conventionally necessary to pass any air used for the air cooling through suitable filtration arrangements.

It is a frequent requirement that relative movement should take place between any article or material to be subjected to heat and the heating coil or heating element.

With the known arrangements this relative movement involves inherent problems in that the construction of the power generation system is such that the when it is necessary to displace the heater coil the movements of the heater coil simultaneously moves the radio frequency valve thereby subjecting the latter to the possibility of unnecessary mechanical disturbances and thus damage.

OBJECT OF THE INVENTION

It is an object of the present invention to provide a radio frequency current generating installation which avoids some of the problems met with known apparatus.

STATEMENTS OF INVENTION

According to a first aspect of the invention there is provided a radio frequency heating apparatus incorporating a radio frequency generator valve, a radio frequency impedance matching transformer and a heating coil/element arrangement which is arranged to be selectively displaceable with respect to a working zone, wherein the heating coil or heating element is integrally associated with the radio frequency impedance matching transformer and is so physically separated from the radio frequency generator valve that on displacement of the heating coil/element arrangement the transformer is constrained to move therewith without mechanically displacing the generator valve.

Preferably, the radio frequency heating apparatus includes a tiltable support for the transformer is supported by a tiltable support, and a tilt producing unit for controlling the tilt of the tiltable support, the arrangement being such the tilting of the support simultaneously displaces the heating coil/element.

In accordance with a further aspect of the invention there is provided a radio frequency heating apparatus as including a control valve and means for ducting cooling air therethrough, the control valve having its operational setting arranged to be responsive to the flow of cooling air therethrough, the arrangement being such that provided the air flow is above a threshold value the valve is remains open to air flow; and whenever the airflow falls below said threshold level the apparatus being cooled by the cooling air is switched OFF or otherwise switched to a quiescent condition.

Conveniently, the tilt producing unit includes a ramp and follower arrangement.

Conveniently, the ramp and follower arrangement is arranged for control by a double acting piston.

BRIEF DESCRIPTION OF THE DRAWING

For a better understanding of the invention and to show how to carry the same into effect reference will now be made to the accompanying drawing which is a schematic representation of radio frequency heating apparatus incorporating the concepts of the invention.

DETAILED DESCRIPTION OF THE DRAWING

Figure 1:
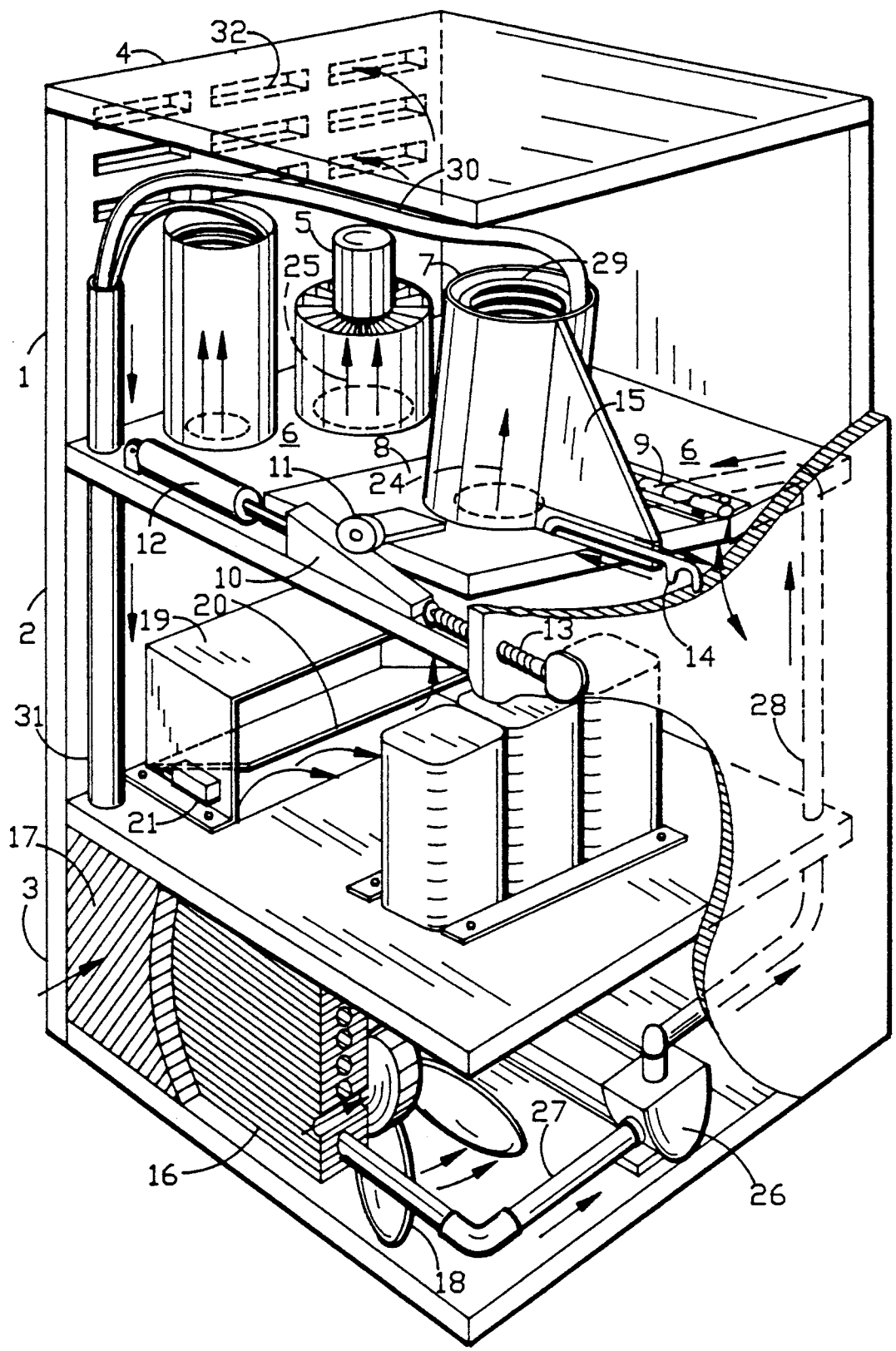

Referring now to the drawing the schematically illustrated radio frequency heating apparatus can very conveniently be regarded as incorporating three principle sections 1, 2, and 3 located one above the other within a main housing 4 which is thus common to all of the sections. The main housing 4 is such as to afford high frequency radiation shielding.

The uppermost section 1 incorporates a radio frequency current generating valve 5 mounted from a support platform 6 provided in the housing 4. A radio frequency impedance matching transformer 7 is mounted to a rockable support table 8 which is pivotally connected to the platform 6 so as to be displaceable up and down. The table 8 is pivoted to the support platform 6 by a pivot element 9 and is raised or lowered by a slidable wedge/ramp 10 cooperating with a follower 11 carried by the table 8. The wedge/ramp 10 is displaceable by a double acting ram 12 which is actuatable by control means (not shown). An adjustable stop arrangement 13 is provided to set the extent of maximum lift of the table 8.

It will be appreciated that other arrangements can be provided for raising and lowering the table 8.

Output from the impedance matching transformer 7 is delivered to a radio frequency heating coil or heating element 14 which is connected to the transformer directly to receive the output therefrom and which moves with the up and down movement of the table.

The support arrangement 15 for the coil/element 14 is such that the actual coil/element is positioned as close as possible to the transformer, and also such that only the actual coil/element projects outwards from the interior of the housing.

In other words all of the components of the apparatus are located within the housing 4 and are thus effectively within a radiation shield.

The heating coil/element 14 is of a tubular form and is cooled by a flow of cooling liquid through a liquid cooling system including an air cooled radiator 16 which is installed at the lowermost section 3 of the apparatus. The liquid cooling system will be discussed hereinafter.

The facilities for air flow cooling include an air circulating fan 18 which draws in air into the interior of the housing section 4 by way of an air cleaner filter 17 and the radiator 16.

The air from the downstream side of the fan is enabled to pass into the second section 3 by way of an air flow control valve arrangement 19. This is shown as a flap valve 20 whose setting is controlled by the pressure/flow of the cooling air passing from the lowermost section 3 into the central section 2. With this arrangement provided the air being drawn into the section 3 is at a rate which exceeds a threshold level the flow of air will keep the flap valve 20 open, and as soon as the flow level falls below such threshold value the flap valve will progressively lower towards a closed position.

To prevent continuation of operation of the high frequency power generation in the absence of cooling air the flap valve is arranged when it has closed to a predetermined level of air flow, to operate a microswitch 21, this micro switch being included in the control system (not shown) for the apparatus. Operation of the microswitch either causes complete switching OFF of the apparatus or the switching of the apparatus to a quiescent condition.

The lowering of the flap valve is indicative that the flow of air has reduced and, in practice, this is a result of the clogging of the filter by detrius removed from the air, and that by the time the flap valve 20 has operated the microswitch the filter needs to be changed or cleaned.

With the air cooling arrangements shown, after the air has passed into the middle section 2, it is utilised to cool the radio frequency valve 5 by providing air outlet from the section 2 into the uppermost section 1 by way of the valve 5. A further flow path from the section 2 to the section 1 is by way of the transformer 7. These air flows have been schematically indicated by arrows 24 and 25. It will be appreciated that the support 6 will be suitably apertured to provide for the air flows.

Furthermore, the air, whilst in the middle section 2, will cool any apparatus components installed in the middle section.

The liquid cooling system includes a liquid reservoir and pump unit 26 which is located in the lowermost section 3.

As will be noted from the Figure cooled liquid from the radiator 16 is fed via a conduit 27 to the pump 26 and travels therefrom via a conduit 28 to a cooling coil 29 associated with the transformer 7. After cooling the transformer 7 the cooling liquid passes back to the radiator 16 by way of a conduit 30 that passes through a guide duct 31 to the radiator 16.

The cooling air finally passes out from the upper section 1 by way of outlets 32.

I claim:

1. An induction heating apparatus comprising a housing containing a platform, a radio frequency current generating valve fixed to the platform, a table hinged for tilting displacement with respect to the platform, an impedance matching transformer fixed to the table having an electrical input coupled to the current generating valve, a heating element fixed to an output of the transformer for coupled movement with the transformer and table, a guide movable with respect to the housing, and a follower coupled to the table and engaging the guide so that movement of the guide is translated into tilting displacement of the table.

2. The induction heating apparatus of claim 1 wherein the guide comprises an inclined ramp.

3. The induction heating apparatus of claim 2 further comprising a double acting piston for moving the guide with respect to the housing.

4. The induction heating apparatus of claim 2 further comprising a stop adjustably positionable with respect to the housing for interaction with the guide to limit the extent of hinged displacement of the table.

5. The induction heating apparatus of claim 2 wherein the heating element projects outward from the housing.

6. The induction heating apparatus of claim 2 further comprising an air input including a filter, a fan for circulating air along an air flow path from the input through the housing toward an air output, and a sensor responsive to the circulating air for indicating the need to replace the filter.

7. The induction heating apparatus of claim 6 wherein said housing includes a baffle situated in the air flow path, the baffle including an opening permitting the circulating air to pass therethrough, and a flap situated in the baffle opening responsive to the circulating air through the opening, and wherein said sensor comprises a switch responsive to the position of the flap situated in the baffle opening.

8. The induction heating apparatus of claim 7 further comprising a control coupled to the switch for restricting the operation of said radio frequency current generating valve when the flow of circulating air is below a predetermined level.

9. The induction heating apparatus of claim 6 further comprising a radiator situated in said air flow path, a conduit coupled to the radiator and to said impedance matching transformer, and a pump for conducting a liquid between the transformer and radiator for cooling the transformer.

10. An induction heating apparatus comprising a housing containing a platform, a radio frequency current generating valve fixed to the platform, a table situated within the housing hinged for tilting displacement with respect to the platform, an impedance matching transformer fixed to the table having an electrical input coupled to the current generating valve, a heating element fixed to an output of the transformer and projecting outward from the housing for coupled movement with the transformer and table, a guide movable with respect to the housing, a follower coupled to the table and engaging the guide so that movement of the guide is translated into tilting displacement of the table, and a stop adjustably positionable with respect to the housing for interaction with the guide to limit the extent of the tilting displacement of the table.

11. The induction heating apparatus of claim 10 further comprising an air input in a wall of the housing including a filter, a fan for circulating air along an air flow path from the input through the housing toward an air output to cool the radio frequency current generating valve, a radiator situated in said air flow path, a conduit coupled to the radiator and to said impedance matching transformer, and a pump for conducting a liquid between the transformer and radiator for cooling the transformer.

12. The induction heating apparatus of claim 11 wherein said housing includes a baffle situated in the air flow path, the baffle including an opening permitting the circulating air to pass therethrough, and a flap situated in the baffle opening responsive to the circulating air through the opening, and a switch responsive to the position of the flap situated in the baffle opening.

13. The induction heating apparatus of claim 12 further comprising a control coupled to the switch for restricting the operation of said radio frequency current generating valve when the flow of circulating air is below a predetermined level.

* * * * *